United States Patent [19]
Vancha

[11] Patent Number: 5,369,398
[45] Date of Patent: Nov. 29, 1994

[54] CIRCUIT FOR DETECTING CALCIFICATION IN A COFFEE MAKER

[75] Inventor: John Vancha, Kewaskum, Wis.

[73] Assignee: The West Bend Company, West Bend, Wis.

[21] Appl. No.: 971,877

[22] Filed: Nov. 5, 1992

[51] Int. Cl.[5] .............................. G08B 21/00
[52] U.S. Cl. .................. 340/635; 340/607; 340/608; 99/285
[58] Field of Search .............. 340/607, 608, 635; 99/280, 285, 295; 219/308, 330, 283

[56] References Cited

U.S. PATENT DOCUMENTS

| | | | |
|---|---|---|---|
| 4,122,763 | 10/1978 | Waninger et al. | 99/281 |
| 4,139,761 | 2/1979 | Obrowski | 99/285 |
| 4,141,286 | 2/1979 | Smit | 99/285 |
| 4,214,148 | 7/1980 | Fleischhauer | 99/285 |
| 4,292,499 | 9/1981 | Kleinschmidt et al. | 99/285 |
| 4,827,837 | 5/1989 | Johnson et al. | 99/285 |
| 4,872,402 | 10/1989 | Johnson et al. | 99/285 |

Primary Examiner—John K. Peng
Assistant Examiner—Edward Lefkowitz
Attorney, Agent, or Firm—Jansson & Shupe, Ltd.

[57] ABSTRACT

The system described in the specification detects and visually indicates the presence of significant calcification in a conduit made of clear (i.e., light-transmitting) material. The present invention directly determines calcification and indicates cleaning of the clear water conduit. An infrared transmitting circuit emits an infrared pulse through the clear conduit. As long as calcification has not formed on the conduit to block the infrared pulse, a phototransistor or infrared receiving circuit receives the infrared pulse. When calcification has formed to a degree sufficient to block the emitted infrared pulse, the receiving circuit determines that calcification has occurred and provides a visual indication to a user that the conduit needs cleaning.

9 Claims, 2 Drawing Sheets

CIRCUIT FOR DETECTING CALCIFICATION IN A COFFEE MAKER

BACKGROUND OF THE INVENTION

1. Field of the Invention

This invention relates to a circuit in a coffeemaker for detecting the presence of calcium deposits. More specifically, the circuit detects an excessive calcium buildup and signals to indicate this buildup.

2. Discussion of the Prior Art

In the past, numerous attempts have been made to detect mineral deposit buildup in automatic coffeemakers. This buildup is caused by a calcium carbonate depositing in the hot water outlet tube of the coffeemaker when the water is heated to sufficient temperatures. The buildup has to be removed periodically and the user must be signalled that such removal is necessary. Past attempts have included indicators to alert the user of this buildup.

U.S. Pat. No. 4,827,837 to Johnson et al. discloses a calcification indicator which operates to notify the user to clean the accumulated mineral deposits. The device utilized to sense the mineral deposit is either electromechanical or a logic circuit.

U.S. Pat. No. 4,141,286 to Smit describes an apparatus for enabling the user to see scale deposits in the outlet pipe. The outlet pipe of the coffee making apparatus is made of transparent material to allow visible inspection by the user.

U.S. Pat. No. 4,139,761 to Obrowski discloses a calcification indicating device in a household coffee machine. The device is connected in parallel with a heating thermostat. At a predetermined temperature, the thermostat opens and the calcification indicator turns on to indicate cleaning of the coffee maker is necessary.

U.S. Pat. No. 4,214,148 to Fleischhauer describes a water heater in a coffee maker having means for indicating calcification of the water heater. A switching circuit utilizes a temperature range to indicate calcification.

U.S. Pat. No. 4,292,499 to Kleinschmidt et al. discloses a system using PTC resistors positioned at a water entry and exit. A circuit determines a differences in current flow which is associated with calcification. An indication is made when cleaning is necessary.

The calcification systems exemplified in the patents referred to hereinabove illustrate the many improvements made over the years in simplifying and improving this aspect of electric coffeemakers. There still exists, however, in this industry, a need for a calcification circuit which detects mineral deposits in a manner that particularly improves the safety, efficiency and economy of the electric drip coffeemakers, and simplifies installation, operation and accountability.

SUMMARY OF THE INVENTION

While the calcification systems noted in the prior art appear to accomplish the result sought, the means used has its drawbacks. In each of the prior art devices, an indirect indicator determines the presence of calcification. This indirect indicator is by way of a temperature element or elements. As the temperature of the element exceeds a predetermined value, the immediate response is that cleaning is necessary.

The present invention addresses the calcification problem directly. The present invention views the contents of the clear water conduit directly by means of an infrared transmitter and a phototransistor receiver positioned on either side of the clear water conduit. When calcification clouds the clear conduit, the phototransistor no longer receives an infrared signal and proceeds to determine that cleaning is necessary. Accordingly, the present invention determines calcification directly from the source of the calcification, rather than indirectly by some temperature resistive element.

It is an object of the invention to include an infrared transmitting circuit to control and output an infrared signal.

Another object of the invention is to include an infrared receiving circuit to receive the infrared signal and for outputting a calcification signal when the infrared signal is not received.

A further object of the invention is to include means for indicating calcification by receiving the calcification and providing a visual indication.

It is an advantage of the invention to position the infrared transmitter and the infrared receiver in close proximity and opposite therefrom each other for determining direct calcification.

Further objects and advantages of the invention will become apparent from a consideration of the drawings and ensuing description.

BRIEF DESCRIPTION OF THE DRAWINGS

FIG. 2 shows the preferred relative positions of certain diode and transistor components of the circuit of FIG. 1 and also symbolically shows light passing through the translucent tube wall.

DESCRIPTION OF THE INVENTION

Figure 1:
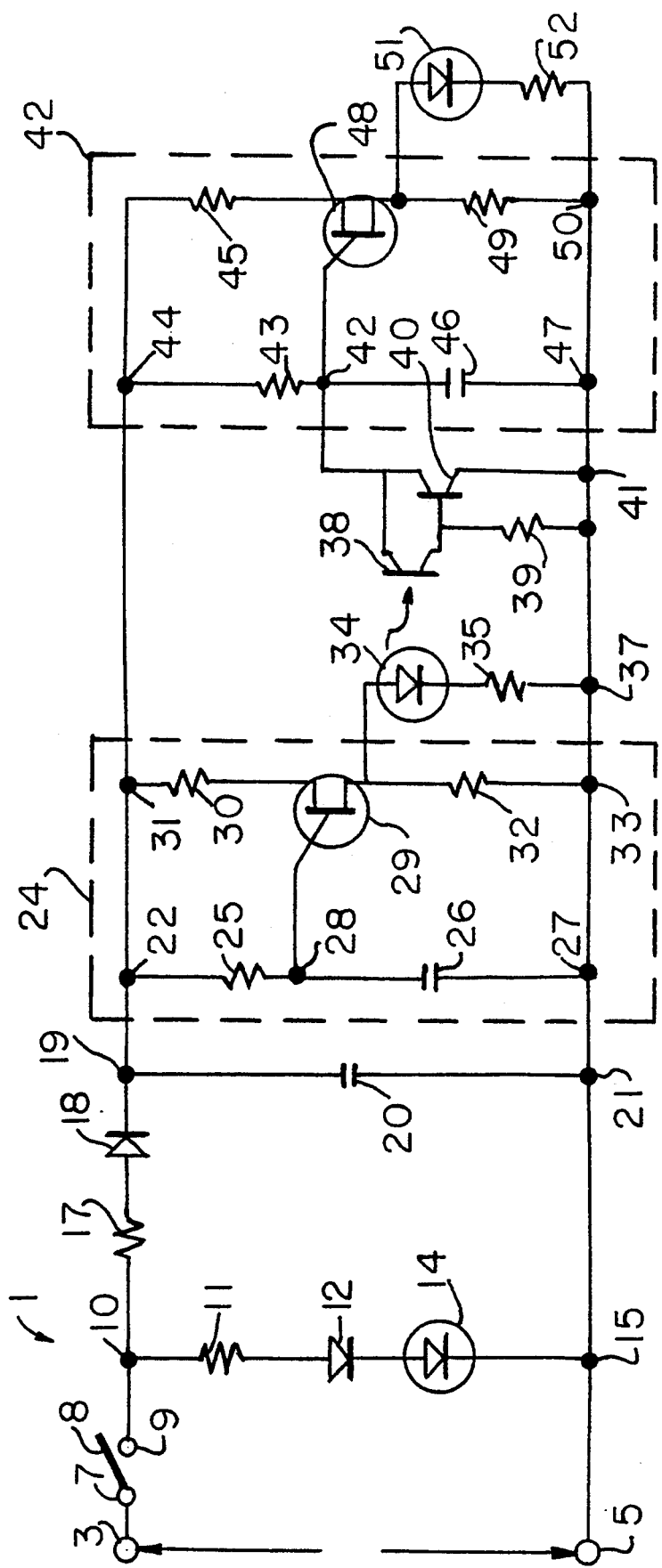
FIG. 1 is a schematic circuit diagram of the inventive system.

The sole FIG. 1 illustrates the circuit 1 which has a positive connection 3 and a ground connection 5. Switch 7 controls the power to the circuit from a first state or OFF position 8 to a second state or ON position 9. Connected to point 10 is a resistor having a value of 33K ohms and a diode 12 having nomenclature IN4004. Connected to diode 12 is a Light-Emitting-Diode 14. This LED 14 indicates the position of switch 7 by remaining off when switch 7 is in the first state or OFF position and turning on when switch 7 is in the second state or ON position. When LED 14 is on, power is flowing through the circuit. LED 14 connects to point 15 which returns to the ground connection 5 of the circuit 1.

Also, connected to point 10 is resistor 17 which has a value of 15K ohms. Connected to resistor 17 is diode 18 which also is an off the shelf diode having nomenclature IN4004. Connection point 19 connects the output of diode 18 and a capacitor 20 having the value of 47MFD. Capacitor 20 has its opposite end tied to point 21. This connection makes the capacitor 20 parallel to the resistor 11, diode 12 and LED 14. Point 21 is connected to the general ground connection 5.

Extending from point 19 is another point 22. Point 22 is part of a first unijunction oscillator circuit 24. This oscillator circuit 24 contains a resistor 25 having the value of 10K ohms. Resistor 25 is tied to point 24 and is in series with a capacitor 26 having the value of 47MFD. Capacitor 26 is connecting to point 27 which is tied to ground 5. Connected between resistor 25 and capacitor 26 is a point 28. Point 28 connects the gate of a transistor 29 having nomenclature 2N6827. The drain of the transistor 29 is connected to a resistor 30 having the value of 220 ohms. Resistor 30 connects to a point 31 which then connects to point 22. The source of transistor 29 connects to a resistor 32 having the value of 56K ohms. Resistor 32 connects to point 33 which is connected to the ground 5.

Additionally, the source of transistor 29 is connected to an infrared LED 34 in the alternative, an LED operating in the visible light spectrum can be used. The output of LED 34 is connected to a resistor 35 having the value of 10K ohms. The resistor 35 is connected to point 37 which is tied to ground 5. In the absence of significant calcification, light from the infrared LED 34 is detected by the phototransistor 38. The phototransistor 38 has its emitter connected to a resistor 39 with the value of 1.2K ohms and the emitter is connected to the base of a subsequent transistor 40 in the alternative Photo-Darlington transistors can be used to replace transistors 38 and 40. Transistor 40 has its emitter tied to ground at point 41. The collector of transistor 40 is tied to the collector of the phototransistor 38 which then feeds a second injunction oscillator circuit generally indicated by numeral 42.

The oscillator circuit 42 includes a resistor 43 having the value of 22K ohms which is tied to point 44. Point 44 is connected to point 31 and to a resistor 45 having the value of 220 ohms. Additionally, resistor 43 is tied to a capacitor 46 having the value of 47MFD. The capacitor 46 is then tied to ground at point 47. Between resistor 43 and capacitor 46 is a point 142. Point 142 connects the gate of a subsequent transistor 48 having the nomenclature of 2N6827. The drain of transistor 48 is tied to the resistor 45. The source of transistor 48 connects to a resistor 49 having the value of 560 ohms which is tied to a ground point 50. Additionally, the source is tied to an LED 51. The LED 51 is a clean light indicator and has its output tied to a resistor 52 having the value of 100 ohms.

Figure 2:
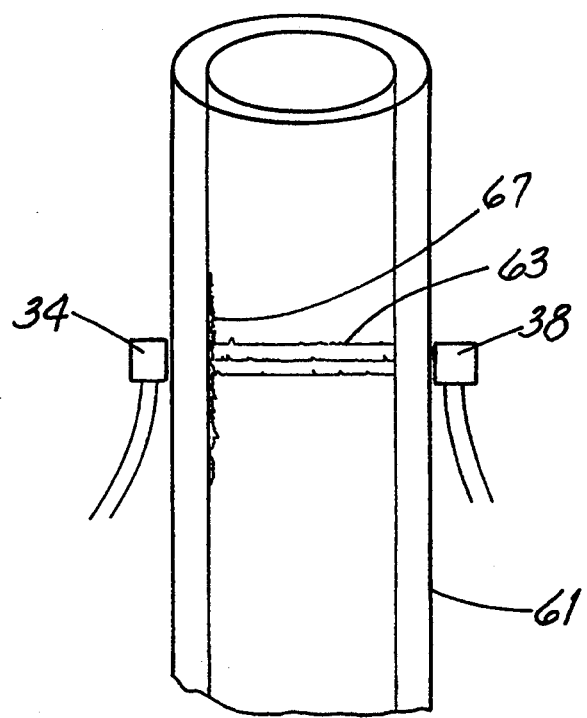
FIG. 2 is a view of a water tube for a coffee maker.

Referring also to FIG. 2, the operation of the circuit 1 begins with the closing of the ON/OFF switch 7. This provides power to the circuit 1. The on indicator LED 14 will light. The unijunction oscillator circuit 24 consists of resistor 25, capacitor 26, transistor 29, resistor 30 and resistor 32. The unijunction oscillator circuit 24 outputs a short energy pulse to the infrared LED 34.

The second unijunction oscillator 42 comprises transistor 48, resistor 43, capacitor 46, resistor 45 and resistor 49. The second unijunction oscillator 42 drives the clean light indicator or LED 51. The second unijunction oscillator operates at approximately half the frequency of oscillator 24.

If the conduit 61 is substantially free of calcification or mineral deposits, phototransistor 38 receives the infrared signal transmitted by the infrared LED 34. The transistor 38 amplifies the signal through transistor 40. At this time, capacitor 46 will discharge. Since, the oscillator 42 operates at approximately half the frequency of the first unijunction oscillator circuit 24, capacitor 46 will never reach its sufficient charge to trigger transistor 48. Of course, this condition occurs only if the drip coffeemaker is clean.

If mineral deposits 67 are present inside the hot water outlet conduit 61, the light emitted by LED 34 (such light being represented by the symbol 63) will be blocked and will not reach transistor 38. Therefore, the oscillator 42 will charge capacitor 46 and cause LED 51 to flash on and off. This flashing indicates that the drip coffeemaker needs cleaning. It should be noted that the infrared LED 34 is positioned in close proximity to the conduit 61 and the phototransistor 38 is directly across or, more specifically, on the diametrically opposite side of the conduit 61.

The mounting details of the circuitry are common in the art and the components can simply be part of a main printed circuitboard. Alternatively, the device can be mounted separately on a plastic part which can snap around the silicone rubber conduit. In any case, the infrared LED 34 and phototransistor 38 must be opposite from each other and can be mounted in many different ways.

While the above description contains many specificities, these should not be construed as limitations on the scope of the invention, but rather as an exemplification of one preferred embodiment thereof. Many other variations are possible. For example, the photoelectric circuit can be used in a digital or microprocessor circuit, whereby a microprocessor port is utilized to pulse the infrared LED or LED operation, and a second port is connected to a photo-transistor to receive an input signal through the silicone rubber conduit. Accordingly, the scope of the invention should be determined not by the embodiment illustrated, but by the appended claims and their legal equivalents.

I claim:

1. In a coffee maker, a system for detecting and indicating calcification in a water conduit made of light-transmitting material, said system comprising:
   a first circuit including a light source positioned near the conduit and emitting a light signal;
   a second circuit including a light receiver positioned so that the conduit is between the light source and the light receiver;
   and wherein:
   the system includes a device for visually indicating the presence of calcification deposits in the conduit; and
   the second circuit actuates the device when calcification deposits impedes the flow of light from the light source to the light receiver, whereby calcification in the conduit is detected.

2. The system of claim 1, wherein:
   the first circuit is an oscillator circuit for periodically energizing the light source.

3. The system of claim 2, wherein:
   the first circuit is a unijunction circuit and the light source is a light emitting diode driven by the first circuit.

4. The system of claim 3, wherein:
   the conduit is tubular;
   the light receiver is a phototransistor;
   the light source is a light emitting diode; and
   the phototransistor and the light emitting diode are positioned substantially diametrically opposite one another.

5. A circuit for detecting and indicating calcification in a coffee maker, the circuit comprising:
   a first oscillator operating at a first frequency and periodically generating an energy pulse;
   a light source oscillator for emitting light upon receiving said energy pulse;
   a phototransistor spaced from the light source, receiving light from the light source and outputting a signal when light is received from the light source;
   a second oscillator connected to said phototransistor and operating at a second frequency;

a calcification indicating device connected to said second oscillator and actuated in the absence of light received by the phototransistor from the light source, such absence due to calcification deposit 6. The circuit of claim 5 wherein:

the indicating device emits light when actuated, thereby visually signalling the presence of calcification.

7. The circuit of claim 6, comprising:

a power switch connected to said first oscillator for turning the circuit on and off; and a light emitter illuminated when the circuit is switched on.

8. A system for detecting and indicating calcification deposits in a water conduit for a coffeemaker, the conduit being made of a light-transmitting material, the system comprising:

a switching device for switching system electrical power between a first "on" state and a second "off" state;

first signalling means connected to the switching device for indicating said first and second states;

first unijunction oscillator circuit connected to said switching device and receiving electrical power for operating at a first frequency and periodically generating an energy pulse;

a first light-emitting device connected to said first unijunction oscillator circuit, said first light-emitting device being mounted adjacent to the conduit and emitting light upon receiving said energy pulse;

a light-detecting device mounted adjacent to the conduit;

second unijunction oscillator circuit connected to said light-detecting device and to a second light-emitting device;

a calcification deposit on the conduit, such calcification deposit being interposed between the first light-emitting device and the light-detecting device;

and wherein:

the calcification deposit prevents light from the first light-emitting device from being detected by the light-detecting device; and the second oscillator circuit periodically powers the second light-emitting device, whereby the presence of the calcification deposit is visually signalled.

9. The system of claim 8, wherein the water conduit is between the first light-emitting device and the light-detecting device.

* * * * *